United States Patent
Manning et al.

(10) Patent No.: US 12,150,206 B2
(45) Date of Patent: Nov. 19, 2024

(54) WIRELESS COMMUNICATION NETWORK AUTHORIZATION OF HOME USER EQUIPMENT AND VISITING USER EQUIPMENT

(71) Applicant: T-Mobile Innovations LLC, Overland Park, KS (US)

(72) Inventors: Serge M. Manning, Plano, TX (US); Gregory David Schumacher, Holliston, MA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 504 days.

(21) Appl. No.: 17/569,974

(22) Filed: Jan. 6, 2022

(65) Prior Publication Data
US 2023/0217236 A1    Jul. 6, 2023

(51) Int. Cl.
| | |
|---|---|
| H04W 92/02 | (2009.01) |
| H04W 8/08 | (2009.01) |
| H04W 8/26 | (2009.01) |
| H04W 12/08 | (2021.01) |
| H04W 84/12 | (2009.01) |
| H04W 88/06 | (2009.01) |
| H04W 92/24 | (2009.01) |

(52) U.S. Cl.
CPC ............. *H04W 8/08* (2013.01); *H04W 12/08* (2013.01)

(58) Field of Classification Search
CPC ................................ H04W 8/08; H04W 12/08
See application file for complete search history.

(56) References Cited

U.S. PATENT DOCUMENTS

| | | | |
|---|---|---|---|
| 8,437,779 B2 | 5/2013 | Phukan | |
| 10,206,154 B2 | 2/2019 | Ganesan | |
| 10,299,128 B1 | 5/2019 | Suthar et al. | |
| 10,531,278 B1 | 1/2020 | Paczkowski et al. | |
| 2009/0282251 A1* | 11/2009 | Cook | H04L 63/18 713/171 |
| 2015/0227890 A1 | 8/2015 | Bednarek et al. | |
| 2017/0026823 A1 | 1/2017 | Mohammed et al. | |
| 2019/0190996 A1* | 6/2019 | Sabeur | H04L 65/80 |
| 2019/0191293 A1* | 6/2019 | Nelson | G06F 16/1824 |
| 2019/0215904 A1* | 7/2019 | Wu | H04W 12/069 |
| 2019/0373472 A1 | 12/2019 | Smith et al. | |
| 2019/0380031 A1* | 12/2019 | Suthar | H04W 60/00 |
| 2021/0037013 A1* | 2/2021 | Salkintzis | H04W 12/04 |

* cited by examiner

*Primary Examiner* — Moustapha Diaby

(57) ABSTRACT

A home network serves a wireless service to visiting User Equipment (UEs) affiliated with visited networks and authorizes the wireless service for home UEs that are visiting the visited networks. A gateway transfers home context to a distributed ledger and receives visited context from the distributed ledger. The gateway transfers the visited context to a controller. The controller exchanges authorization data with the visited networks based on the visited context and the home context. The controller authorizes the wireless data service for the home UEs and the visiting UEs responsive to the exchange of the authorization data. The controller transfers session signaling to wireless access nodes responsive to the authorization of the wireless data service for the visiting UEs. The controller transfers authorization signaling to the visited networks responsive to the authorization of the wireless service for the home UEs.

20 Claims, 11 Drawing Sheets

WIRELESS COMMUNICATION NETWORK AUTHORIZATION OF HOME USER EQUIPMENT AND VISITING USER EQUIPMENT

TECHNICAL BACKGROUND

Wireless communication networks provide wireless data services to wireless user devices. Exemplary wireless data services include machine-control, internet-access, media-streaming, and social-networking. Exemplary wireless user devices comprise phones, computers, vehicles, robots, and sensors. The wireless user devices execute user applications that use the wireless data services. For example, a smart-phone may execute a social-networking application that communicates with a content server over a wireless communication network.

The wireless communication networks have wireless access nodes which exchange wireless signals with the wireless user devices over radio frequency bands. The wireless signals use wireless network protocols like Fifth Generation New Radio (5GNR), Long Term Evolution (LTE), Institute of Electrical and Electronic Engineers (IEEE) 802.11 (WIFI), and Low-Power Wide Area Network (LP-WAN). The wireless access nodes exchange network signaling and user data with network elements that are often clustered together into wireless network cores. The wireless network elements comprise Access and Mobility Management Functions (AMFs), Security Edge Protection Proxies (SEPPs), User Plane Functions (UPFs), and the like.

A given wireless user device has a home wireless communication network but can also roam onto other wireless communication networks for service. When a wireless user device roams onto a visited network, the visited network contacts the home network for authorization. When the home network authorizes the roaming user device, then the visited network serves the roaming user device. When a wireless user device from the visited network visits the home network, then the home network contacts the visiting network for authorization. When the visited network authorizes the visiting user device, then the home network serves the visiting user device.

The wireless communication networks use network context to exchange the roaming authorization data in a secure manner. The network context comprises network-to-network communication information for Transport Layer Security (TLS), Internet Protocol Security (IPSec), Internet Protocol (IP) addressing, Internetwork Packet Exchange (IPX), public cryptography keys, Certificate Authorities (CAs), and/or some other networking data. The network context is typically manually exchanged between pairs of networks. Changes to the network context are manually shared between pairs of networks. The number of roaming networks and corresponding network context changes is rapidly expanding.

In a distributed ledger, a blockchain comprises a series of data blocks that store transactional information like account balances and title ownership. The blockchain is hosted by multiple geo-diverse ledger nodes that each execute a replicated contract to store identical contract results in redundant data blocks. The redundant data blocks in the blockchain are linked to one another by each data blocks storing a hash of the previous data block. Unfortunately, the distributed ledgers are not effectively integrated within the wireless communication networks. Moreover, the wireless communication networks do not efficiently use distributed ledgers to share network context that facilitates the exchange of roaming authorization data.

TECHNICAL OVERVIEW

To authenticate User Equipment (UEs), communication networks first establish network-to-network connections based on network context, and then the communication networks exchange authentication data for the UEs over the network-to-network connections. The network context characterizes Transport Layer Security (TLS), Internet Protocol Security (IPSec), Internet Protocol (IP) addressing, Internetwork Packet Exchange (IPX), public cryptography keys, Certificate Authorities (CAs), and/or some other aspect of the network-to-network interface. To establish these network-to-network connections, a home network gateway transfers home network communication context for the home network to a distributed ledger. The distributed ledger transfers the home network communication context to visited network gateways. The visited network gateways transfer the home communication context to visited network controllers. In a reciprocal manner, the visited network gateways transfer visited network communication context for visited networks to the distributed ledger. The distributed ledger transfers the visited network communication context to the home network gateway. The home network gateway transfers the visited communication context to the home network controller. The home and visited network controllers use the home and visited context to establish the network-to-network connections. To authenticate the UEs, the network controllers exchange the authorization data for the UEs over the network-to network connections. The home network controller authorizes wireless data service for the home UEs that are visiting the visited networks responsive to the exchange of the authorization data. The home network controller transfer authorization signaling to the visited network controllers responsive to the authorization of the wireless data service for the home UEs. The visited network controllers authorize wireless data service for the visiting UEs that are visiting the home network responsive to the exchange of the authorization data. The visited network controllers transfer authorization signaling to the home network controller responsive to their authorization of the wireless data service for the visiting UEs—and the home network controller authorizes wireless data service for the visiting UEs responsive to this authorization signaling.

DETAILED DESCRIPTION

Figure 1:
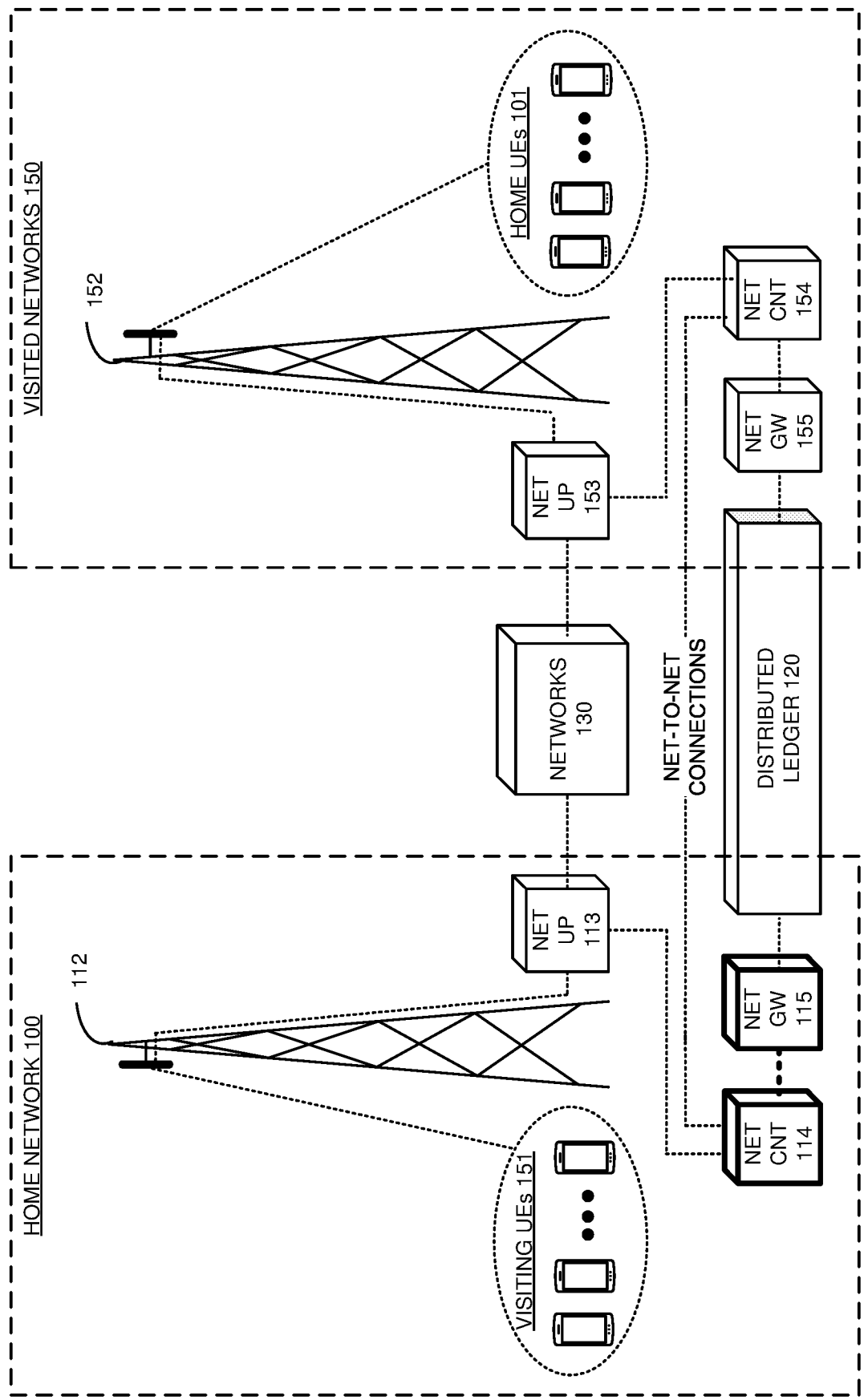
FIG. 1 illustrates an exemplary home wireless communication network to serve a wireless data service to visiting User Equipment (UEs) that are affiliated with visited networks and to authorize the wireless data service for home UEs that are visiting the visited networks.

FIG. 1 illustrates exemplary home wireless communication network 100 to serve a wireless data service to visiting User Equipment (UEs) 151 that are affiliated with visited networks 150 and to authorize the wireless data service for home UEs 101 that are visiting visited networks 150. Exemplary wireless data services include machine-control, internet-access, media-streaming, social-networking, and/or some other networking product. Visiting UEs 151 are affiliated with visited networks 150 and are visiting home network 100. Home UEs 101 are affiliated with home network 100 and are visiting visited networks 150. Networks 100 and 150 also serve their own home UEs which are not shown for clarity. Home wireless communication network 100 currently comprises wireless access nodes 112, network user-plane (NET UP) 113, network controller (NET CNT) 114, network gateway (NET GW) 115, and a portion of distributed ledger 120. Visited wireless communication networks 150 comprise wireless access nodes 152, network user-planes 153, network controllers 154, network gateways 155, and portions of distributed ledger 120. UEs 101 and 151 comprise computers, phones, vehicles, sensors, robots, or some other data appliance with data communication circuitry. In some examples, network controllers 114 and 154 each comprise an Access and Mobility Management Function (AMF) and/or a Security Edge Protection Proxy (SEPP).

Various examples of network operation and configuration are described herein. To authenticate User Equipment (UEs) 101 and 151, networks 100 and 150 first establish network-to-network connections based on network context, and then the networks 100 and 150 exchange authentication data over the network-to-network connections. The network context characterizes Transport Layer Security (TLS), Internet Protocol Security (IPSec), Internet Protocol (IP) addressing, Internetwork Packet Exchange (IPX), public cryptography keys, Certificate Authorities (CAs), and/or some other aspect of the network-to-network interface. To establish the network-to-network connections, home network gateway 115 transfers home network communication context for home network 100 to distributed ledger 120. Distributed ledger 120 transfers the home network communication context to visited network gateways 155. Visited network gateways 155 transfer the home communication context to visited network controllers 154. In a reciprocal manner, visited network gateways 155 transfer visited network communication context for visited networks 150 to distributed ledger 120. Distributed ledger 120 transfers the visited network communication context to home network gateway 115. Home network gateway 115 transfers the visited communication context to home network controller 114. Home network controller 114 and visited network controllers 154 use the home and visited context to establish the network-to-network connections. To authenticate UEs 101 and 151, home network controller 114 and visited network controllers 154 exchange authorization data for UEs 101 and 151 over the network-to network connections. Home network controller 114 authorizes wireless data service for home UEs 101 that are visiting visited networks 150 responsive to the exchange of the authorization data. Home network controller 114 transfers authorization signaling to visited network controllers 154 responsive to its authorization of the wireless data service for home UEs 101. Visited network controllers 154 authorize wireless data service for visiting UEs 151 that are visiting home network 100 responsive to the exchange of the authorization data. Visited network controllers 154 transfer authorization signaling to home network controller 114 responsive to their authorization of the wireless data service for visiting UEs 151—and home network controller 114 authorizes wireless data service for visiting UEs 151 responsive to this authorization signaling.

Network controller 114 transfers session signaling to wireless access nodes 112 and network user plane 113 responsive to the authorization of the wireless data service for visiting UEs 151. Wireless access nodes 112 and network user-plane 113 deliver the wireless data service to visiting UEs 151 responsive to the session signaling. Network controllers 154 transfers session signaling to wireless access nodes 152 and network user planes 153 responsive to the authorization of the wireless data service for home UEs 101. Wireless access nodes 152 and network user-planes 153 deliver the wireless data service to home UEs 101 responsive to the session signaling.

Advantageously, distributed ledger 120 is effectively integrated within networks 100 and 150. Moreover, wireless communication networks 100 and 150 efficiently use distributed ledger 120 to share network context that facilitates the exchange of roaming authorization data.

UEs 101 and 151 wirelessly communicate with wireless access nodes 112 and 152 over wireless links that use wireless technologies like Fifth Generation New Radio (5GNR), Long Term Evolution (LTE), Institute of Electrical and Electronic Engineers (IEEE) 802.11 (WIFI), Low-Power Wide Area Network (LP-WAN), Bluetooth, and/or some other wireless communication protocols. Wireless access nodes 112 and 152, user-planes 113 and 153, controllers 114 and 154, gateways 115 and 155, ledger 120, and networks 130 communicate over network connections that comprise metallic wiring, glass fibers, radio channels, or some other communication media. The network connections use technologies like IEEE 802.3 (ETHERNET), Internet Protocol (IP), Time Division Multiplex (TDM), Data Over Cable System Interface Specification (DOCSIS), General Packet Radio Service Transfer Protocol (GTP), 5GNR, LTE, WIFI, LP-WAN, Bluetooth, virtual switching, inter-processor communication, bus interfaces, and/or some other data communication protocols. UEs 101 and 151 and wireless access nodes 112 and 152 include radios. UEs 101 and 151, Wireless access nodes 112 and 152, user-planes 113 and 153, controllers 114 and 154, gateways 115 and 155, ledger 120, and networks 130 comprise microprocessors, software, memories, transceivers, bus circuitry, and the like. The microprocessors comprise Digital Signal Processors (DSP), Central Processing Units (CPU), Graphical Processing Units (GPU), Application-Specific Integrated Circuits (ASIC), and/or the like. The memories comprise Random Access Memory (RAM), flash circuitry, disk drives, and/or the like. The memories store software like operating systems, user applications, radio applications, and network functions. The microprocessors retrieve the software from the memories and execute the software to drive the operation of wireless communication networks 100 and 150 as described herein.

Figure 2:
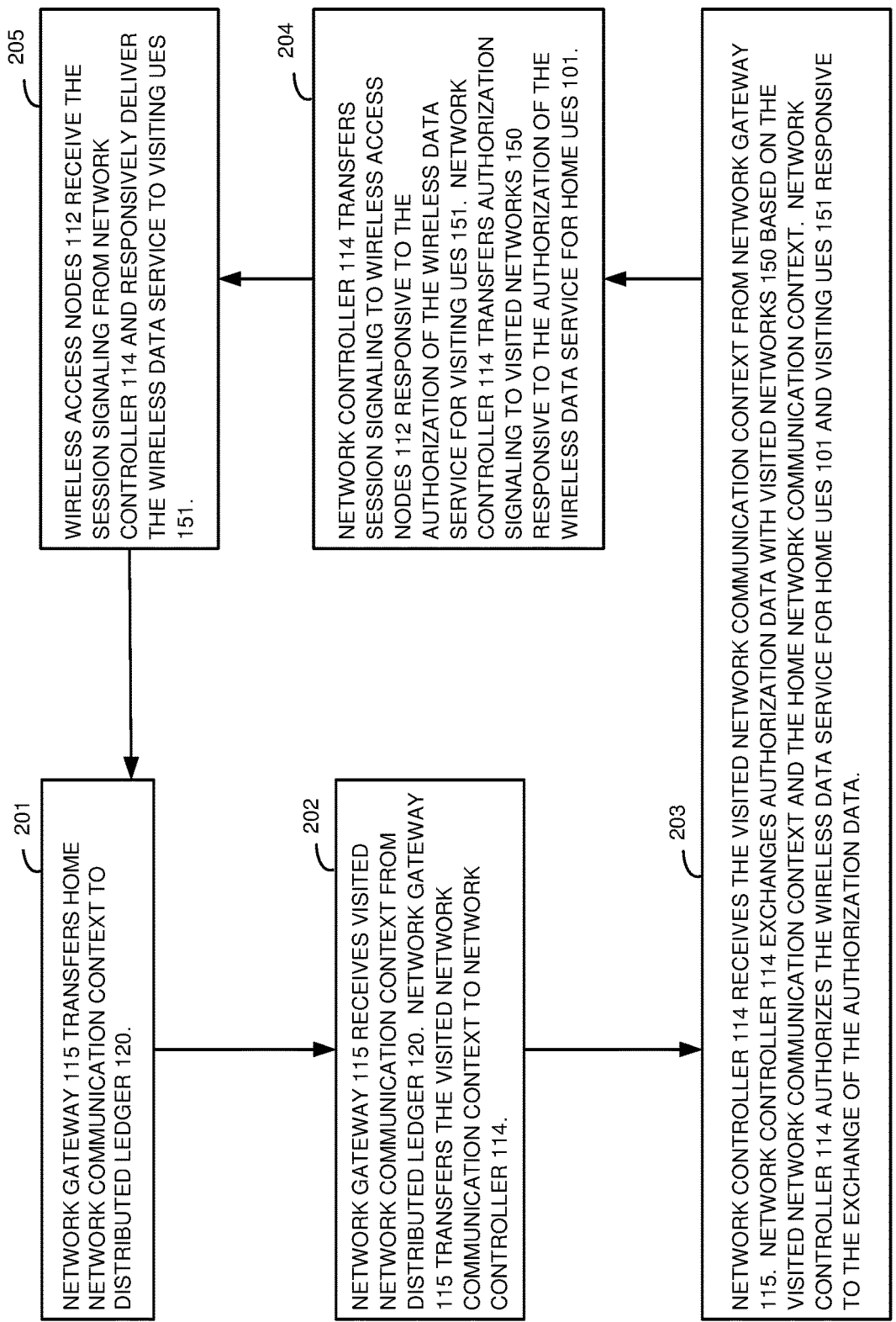
FIG. 2 illustrates an exemplary operation of the home wireless communication network to serve the wireless data service to visiting UEs that are affiliated with the visited networks and to authorize the wireless data service for home UEs that are visiting the visited networks.

FIG. 2 illustrates an exemplary operation of home wireless communication network 100 to serve the wireless data service to visiting UEs 151 that are affiliated with visited networks 150 and to authorize the wireless data service for home UEs 101 that are visiting visited networks 150. The operation may vary in other examples. Network gateway 115 transfers home network communication context to distributed ledger 120 (201). Network gateway 115 receives visited network communication context from distributed ledger 120 (202). Network gateway 115 transfers the visited network communication context to network controller 114 (202). Network controller 114 receives the visited network communication context from network gateway 115 (203). Network controller 114 exchanges UE authorization data with visited networks 150 over network-to-network connections based on the visited network communication context and the home network communication context (203). Network controller 114 authorizes the wireless data service for home UEs 101 and visiting UEs 151 responsive to the exchange of the authorization data (203). Network controller 114 transfers session signaling to wireless access nodes 112 responsive to the authorization of the wireless data service for visiting UEs 151 (204). Network controller 114 transfers authorization signaling to visited networks 150 responsive to the authorization of the wireless data service for home UEs 101 (204). Wireless access nodes 112 receive the session signaling from network controller 114 and responsively delivers the wireless data service to visiting UEs 151 (205).

Figure 3:
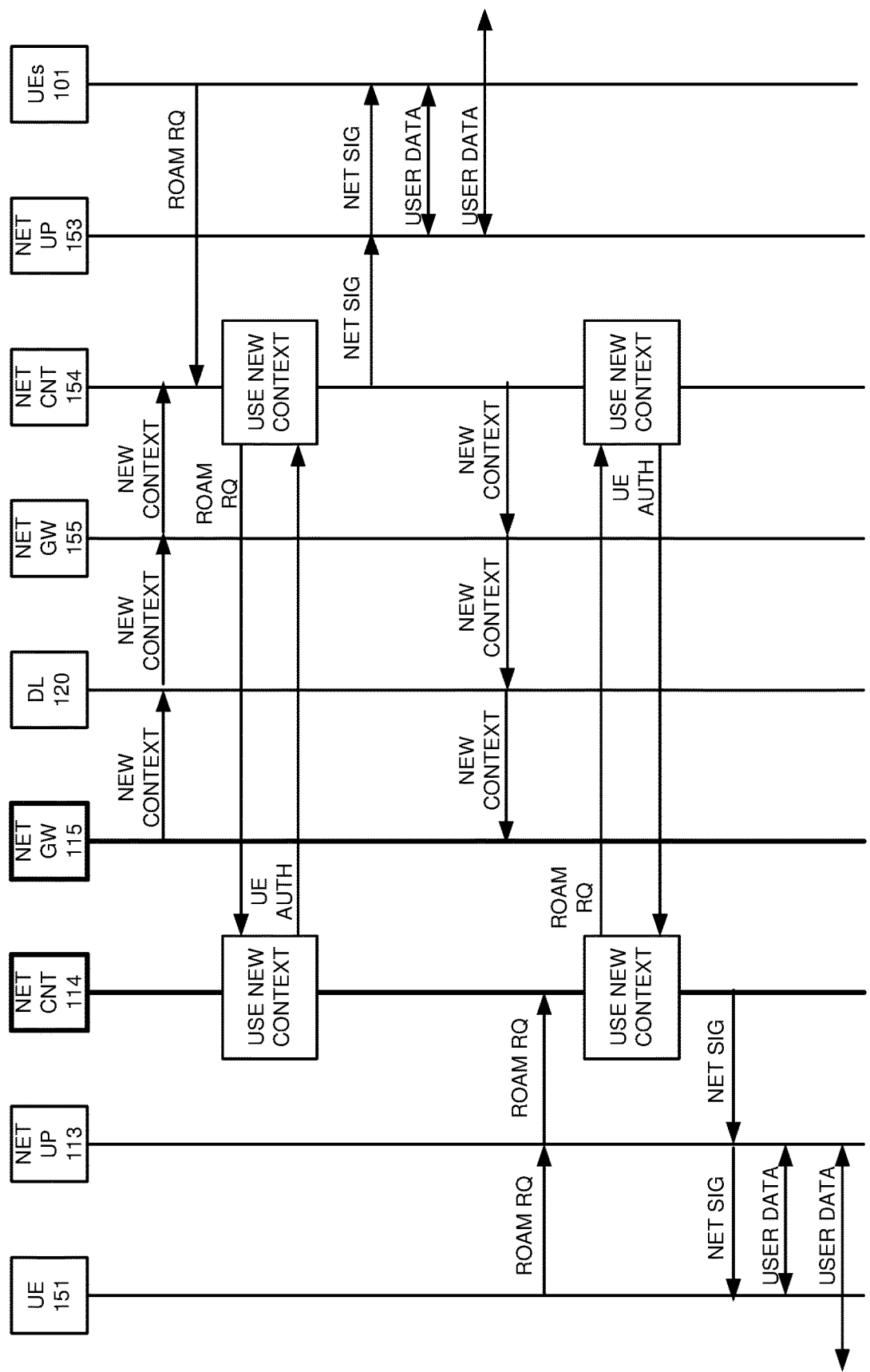
FIG. 3 illustrates an exemplary operation of the home wireless communication network to serve the wireless data service to visiting UEs that are affiliated with the visited networks and to authorize the wireless data service for home UEs that are visiting the visited networks.

FIG. 3 illustrates an exemplary operation of home wireless communication network 100 to serve the wireless data service to visiting UEs 151 that are affiliated with visited networks 150 and to authorize the wireless data service for home UEs 101 that are visiting visited networks 150. The operation may vary in other examples. Network gateway 115 transfers new network communication context for home network 100 to distributed ledger 120. Distributed ledger 120 transfers the new home network communication context to network gateways 155. Network gateways 155 transfer the new home communication context to network controllers 154. Home UEs 101 are visiting visited networks 150 and transfer roaming requests (ROAM RQ) to network controllers 154. Network controllers 154 transfer the roaming requests to network controller 114 based on the new home network communication context. For example, network controllers 154 may use a new public key for home network 100 contained in an X.509 certificate from home network 100. Network controller 114 authorizes wireless data service for home UEs 101 responsive to the roaming request and transfers authorization signaling for home UEs 101 to network controllers 154 using the new home network communication context. Network controllers 154 transfer session signaling to network user planes 153 (and wireless access nodes 152) responsive to the authorization of the wireless data service for home UEs 101. Home UEs 101 exchange user data with external systems over user-planes 153 (and wireless access nodes 152) to deliver the wireless data service responsive to the session signaling.

One of network gateways 155 transfers new network communication context for one of visited networks 150 to distributed ledger 120. Distributed ledger 120 transfers the new visited network communication context to network gateway 115. Network gateway 115 transfers the new visited communication context to network controller 114. Visited UEs 151 are visiting home network 100 and transfer roaming requests to network controller 114. Network controller 114 transfers the roaming requests to the one of network controllers 154 based on the new visited network communication context. For example, network controller 114 may use new IP addresses for the one of controllers 154. The one of network controllers 154 authorizes wireless data service for visiting UEs 151 responsive to the roaming requests and transfers authorization signaling for UEs 151 to network controller 114 using the new context. Network controller 114 authorizes wireless data service for visiting UEs 151 responsive to the authorization signaling from the one of network controllers 154 and transfers session signaling to network user plane 113 (and wireless access nodes 112) responsive to the authorization of the wireless data service for visiting UEs 151. Visiting UEs 151 exchange user data with external systems over user-plane 113 (and wireless access nodes 112) to deliver the wireless data service responsive to the session signaling.

Figure 4:
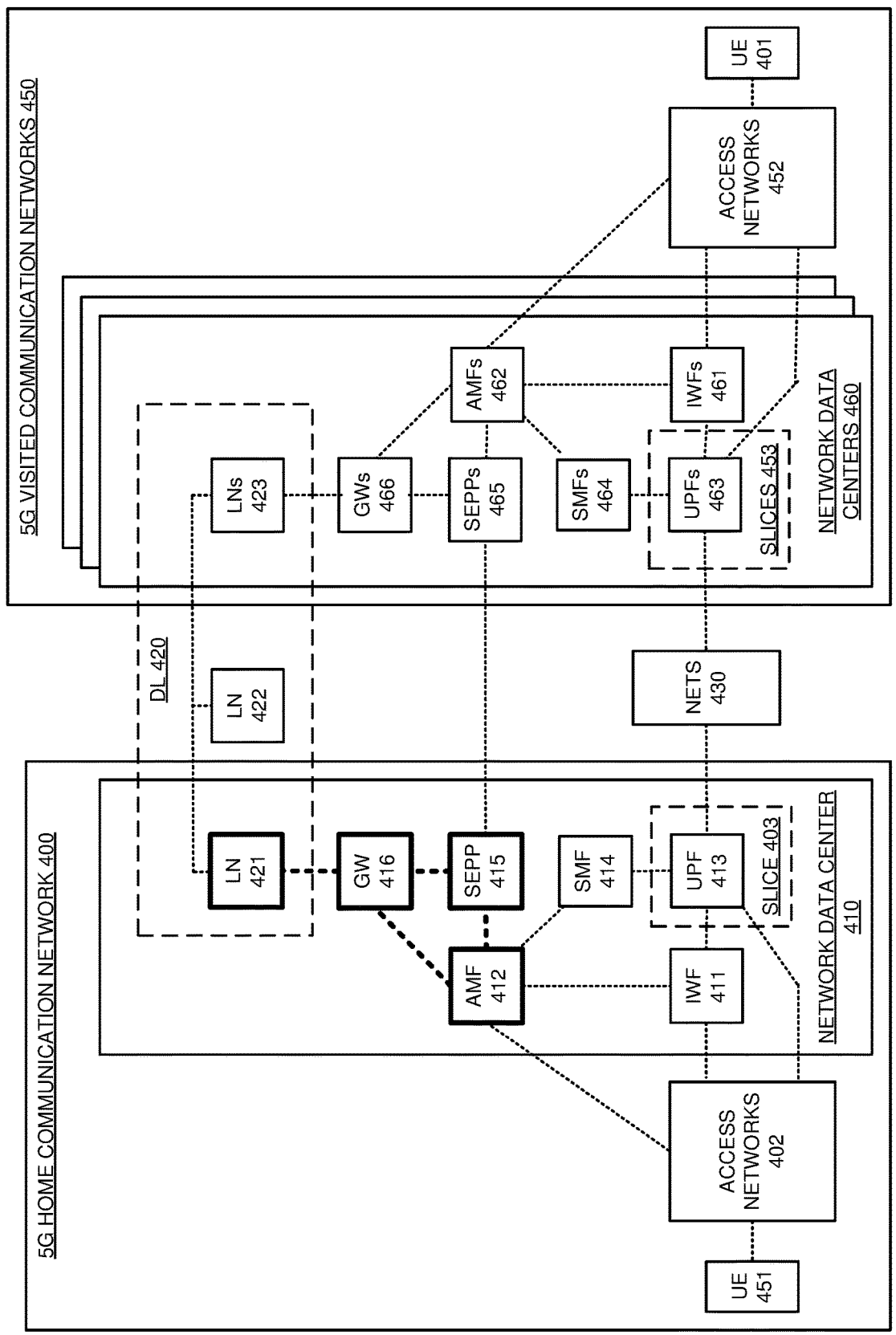
FIG. 4 illustrates an exemplary Fifth Generation (5G) home communication network to serve wireless data service to visiting UEs that are affiliated with visited networks and to authorize the wireless data service for home UEs that are visiting the visited networks.

FIG. 4 illustrates exemplary Fifth Generation (5G) home communication network 400 to serve wireless data service to visiting UEs 451 that are affiliated with 5G visited communication networks 450 and to authorize the wireless data service for home UEs 401 that are visiting 5G visited communication networks 450. 5G home communication network 400 comprises: wireless access networks 402 and network data center 410. Network data center 410 comprises wireless network slice 403, non-Third Generation Partnership Project (non-3GPP) Interworking Function (IWF) 411, Access and Mobility Management Function (AMF) 412, Session Management Function (SMF) 414, Security Edge Protection Proxy (SEPP) 415, ledger Gateway (GW) 416, and Ledger Node (LN) 421. Wireless network slice 403 comprises User Plane Function (UPF) 413. 5G visited communication networks 450 comprises: wireless access networks 452 and network data centers 460. Network data centers 460 comprises wireless network slices 453, non-3GPP IWFs 461, AMFs 462, SMFs 464, SEPPs 465, ledger GWs 466, and LNs 423. Wireless network slices 453 comprises UPFs 463. Distributed ledger 420 comprises LNs 421-423.

SEPP 415 is configured with a new public cryptography key, and in response, SEPP 415 transfers its new public cryptography key to GW 416. GW 416 transfers the new public cryptography key for SEPP 415 to LN 421. LNs 421-423 to develop consensus on the new public cryptography key for SEPP 415. In this example, consensus is achieved when LN 421—the source of the new context—is authenticated and authorized by LNs 422-423. LNs 423 notify GWs 466 of the new transaction—the new public cryptography key for SEPP 415 in home network 400. GWs 466 transfer the new public cryptography key for SEPP 415 in home network 400 to SEPPs 465.

Contemporaneously, one of SEPPs 465 is configured to use a new Certificate Authority (CA) for its digital certificates, and in response, transfers its new CA ID to one of GWs 466 which transfers the new CA ID to one of LNs 423. LNs 421-423 to develop consensus on the new CA ID. LN 421 notifies GW 416 of the new transaction—the new CA ID for one of SEPPs 465. GW 416 transfers the new CA ID for the one of SEPPs 465 to SEPP 415.

UE 401 is affiliated with 5G home communication network 400 but is visiting one of 5G visited communication networks 450. UE 401 transfer a roaming request to one of AMFs 462 which transfers the roaming request to the one of SEPPs 465 with the new CA. The one of SEPPs 465 transfers a roaming request for UE 401 to SEPP 415 and uses the new CA for its digital certificate to SEPP 415. SEPP 415 uses the new CA ID to validate the digital certificate from the one of SEPPs 465. The one of SEPPs 465 uses the new public key for SEPP 415 to authenticate SEPP 415. SEPP 415 transfers the roaming request to AMF 412 which authenticates and authorizes UE 401 and transfers a roaming authorization for UE 401 to SEPP 415. SEPP 415 transfers the roaming authorization for UE 401 to the one of SEPPs 465. The one of SEPPs 465 transfers the roaming authorization for UE 401 to the one of AMFs 462. The one of AMFs 462 signals one of SMFs 464, UE 401, and one of IWFs 461 or access networks 452 to serve UE 401. The one of SMFs 464 signals one of UPFs 463 to serve UE 401. UE 401 exchanges user data with networks 430 and possibly network 400 over one of access networks 452 and data centers 460.

UE 451 is affiliated with 5G visited communication network 450 but is visiting 5G home communication network 400. UE 451 transfers a roaming request to AMF 412 which transfers the roaming request to SEPP 415. SEPP 415 transfers the roaming request for UE 451 to the one of SEPPs 465 that has the new CA and uses the new CA ID to validate its digital certificate. The one of SEPPs 465 uses the new public key to authenticate SEPP 415. The one of SEPPs 465 transfers the roaming request to one of AMFs 462 which authenticates and authorizes UE 451 and transfers a roaming authorization for UE 451 to the one of SEPPs 465. The one of SEPPs 465 transfers the roaming authorization for UE 451 to SEPP 415. SEPP 415 transfers the roaming authorization for UE 451 to AMF 412. AMF 412 signals SMF 414, UE 451, and IWFs 411 or access networks 402 to serve UE 451. SMF 414 signals UPF 413 to serve UE 451. UE 451 exchanges user data with networks 430 and possibly its one of networks 450 over one of access networks 402 and data center 410.

Figure 5:
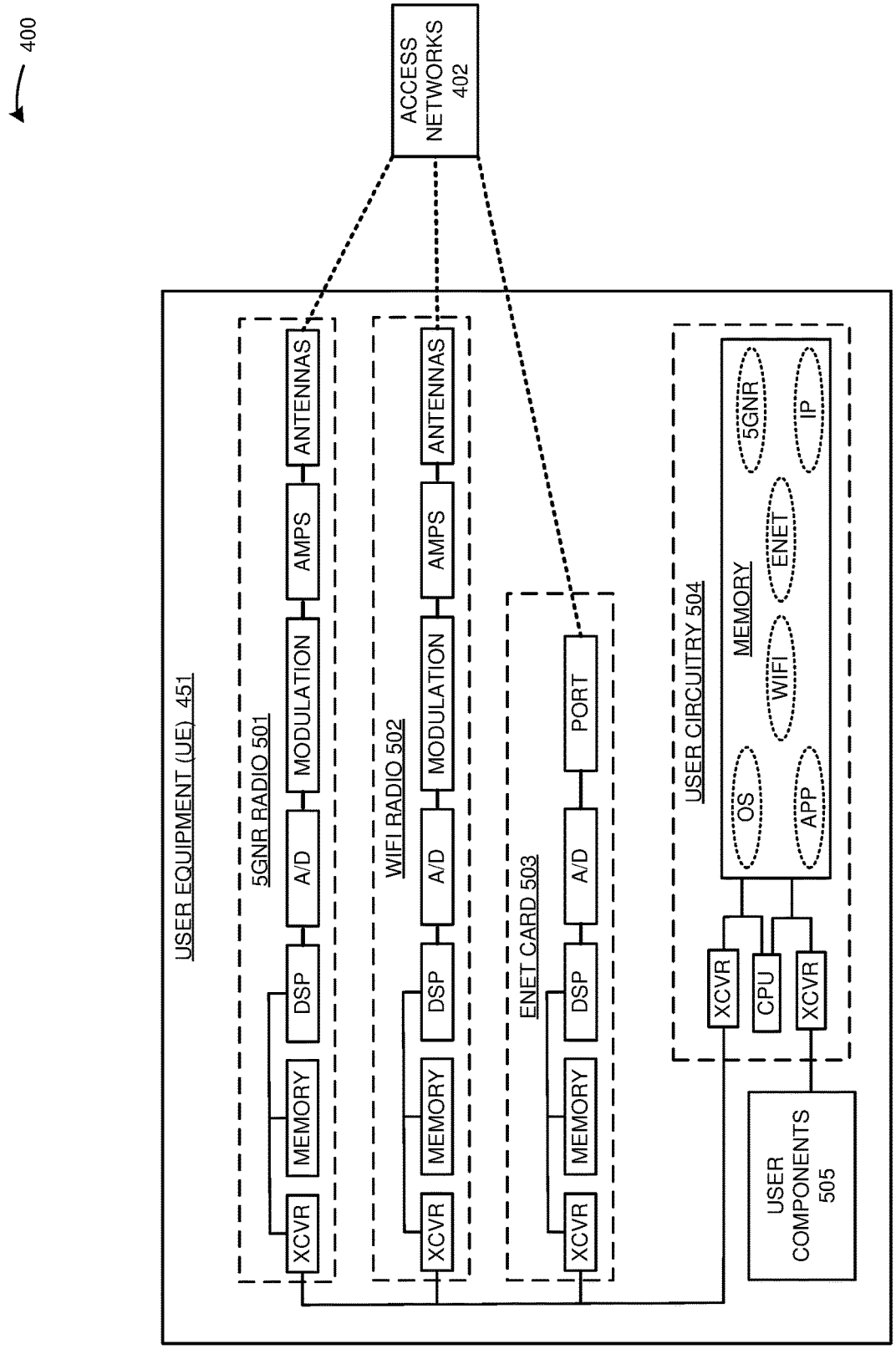
FIG. 5 illustrates an exemplary UE in the 5G home communication network.

FIG. 5 illustrates exemplary UE 401 that is affiliated with 5G home communication network 400. UE 401 comprises an example of UEs 101, 151, and 451, although UEs 101, 151, and 451 may differ. UE 401 comprises 5GNR radio 501, WIFI radio 502, Ethernet (ENET) card 503, user circuitry 504, and user components 505. User components 505 comprise sensors, controllers, displays, or some other user apparatus that generates slice data. Radios 501-502 comprise antennas, amplifiers, filters, modulation, analog-to-digital interfaces, DSP, memory, and transceivers that are coupled over bus circuitry. ENET card 503 comprises ports, analog-to-digital interfaces, DSP, memory, and transceivers that are coupled over bus circuitry. User circuitry 504 comprises memory, CPU, user interfaces and components, and transceivers that are coupled over bus circuitry. The memory in user circuitry 504 stores an operating system (OS), user applications (APP), and network applications for WIFI, ENET, 5GNR, and IP. The antennas in 5GNR radio 501 are wirelessly coupled to access networks 402 over a 5GNR link. The antennas in WIFI radio 502 are wirelessly coupled to access networks 402 over a WIFI link. The port in ENET card 503 is wireline coupled to access networks 402 over an Ethernet link. Transceivers (XCVRs) in radios 501-502 and card 503 are coupled to transceivers in user circuitry 504. Transceivers in user circuitry 504 are coupled to user components 505. The CPU in user circuitry 504 executes the operating system, user applications, and network applications to exchange network signaling and user data with access networks 402 over radios 501-502 and/or card 503. In some examples, some of the 5GNR, WIFI, and ENET components could be omitted. For example, the 5GNR and ENET portions could be omitted to form a WIFI-only UE. The 5GNR and WIFI portions could be omitted to form an ENET-only UE. The WIFI and ENET portions could be omitted to form a 5GNR-only UE. Other device combinations could be used like 5GNR/WIFI, 5GNR/ENET, and WIFI/ENET. Other network communication interfaces could be used like LP-WAN and LTE.

Figure 6:
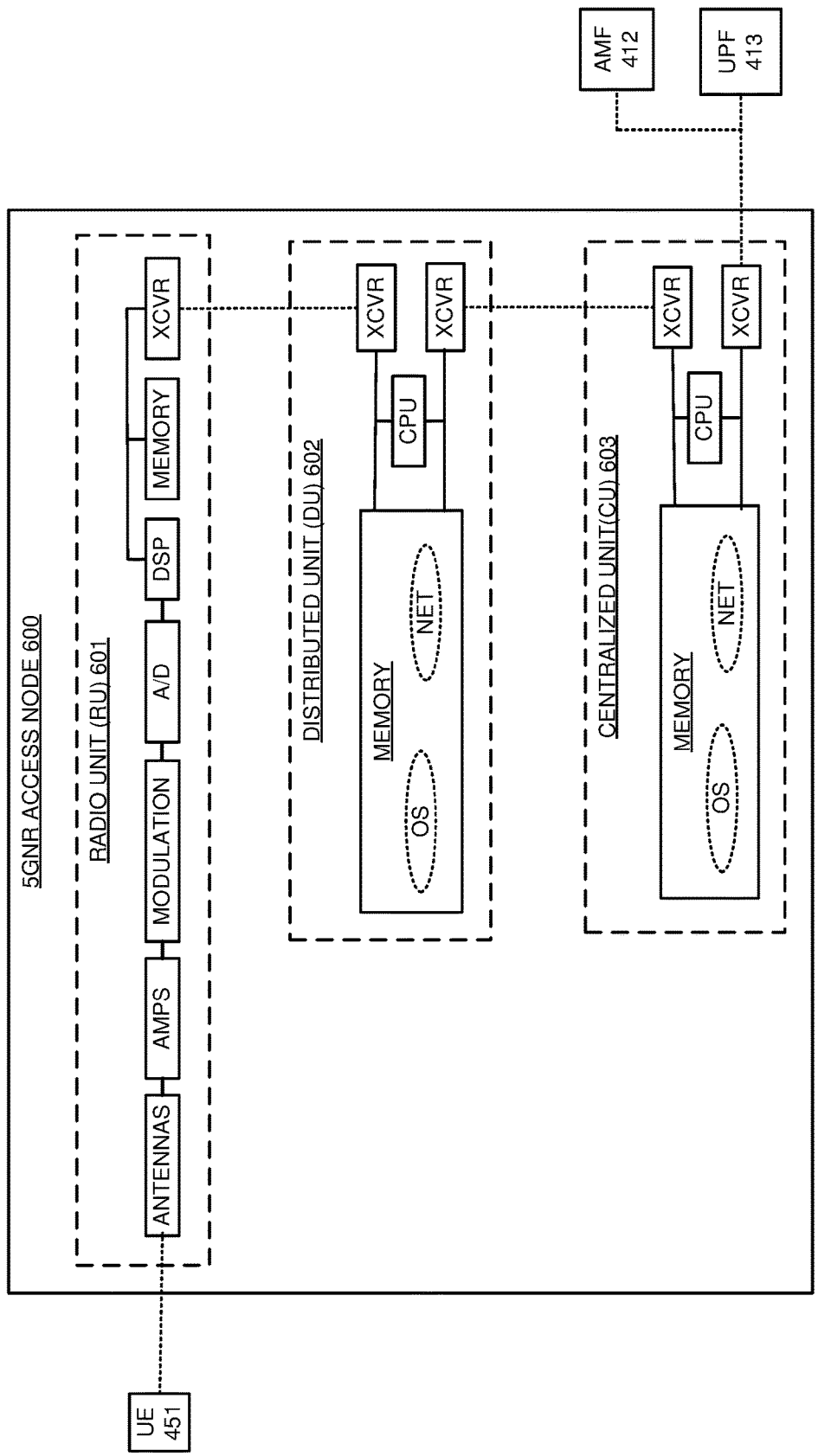
FIG. 6 illustrates an exemplary 5G New Radio (5GNR) access node in the 5G home communication network.

FIG. 6 illustrates exemplary 5G New Radio (5GNR) access node 600 in 5G home communication network 400. 5GNR access node 600 comprises an example of wireless access nodes 112 and 152 and access networks 402 and 452, although nodes 112 and 152 and networks 402 and 452 may differ. 5GNR access node 600 comprises Radio Unit (RU) 601, Distributed Unit (DU) 602, and Centralized Unit (CU) 603. RU 601 comprises 5GNR antennas, amplifiers, filters, modulation, analog-to-digital interfaces, DSP, memory, radio applications, and transceivers that are coupled over bus circuitry. DU 602 comprises memory, CPU, user interfaces and components, and transceivers that are coupled over bus circuitry. The memory in DU 602 stores operating system 604 and network applications for physical layer, media access control, and radio link control. CU 603 comprises memory, CPU, user interfaces and components, and transceivers that are coupled over bus circuitry. The memory in CU 603 stores an operating system and network applications for packet data convergence protocol, service data adaption protocol, and radio resource control. The antennas in RU 601 are wirelessly coupled to UE 451 over 5GNR links. Transceivers in RU 601 are coupled to transceivers in DU 602. Transceivers in DU 602 are coupled to transceivers in CU 603. Transceivers in CU 603 are coupled to AMF 412 and UPF 413. The DSP and CPU in RU 601, DU 602, and CU 603 execute radio applications, operating systems, and network applications to exchange network signaling and user data with UEs, AMFs, and UPFs.

Figure 7:
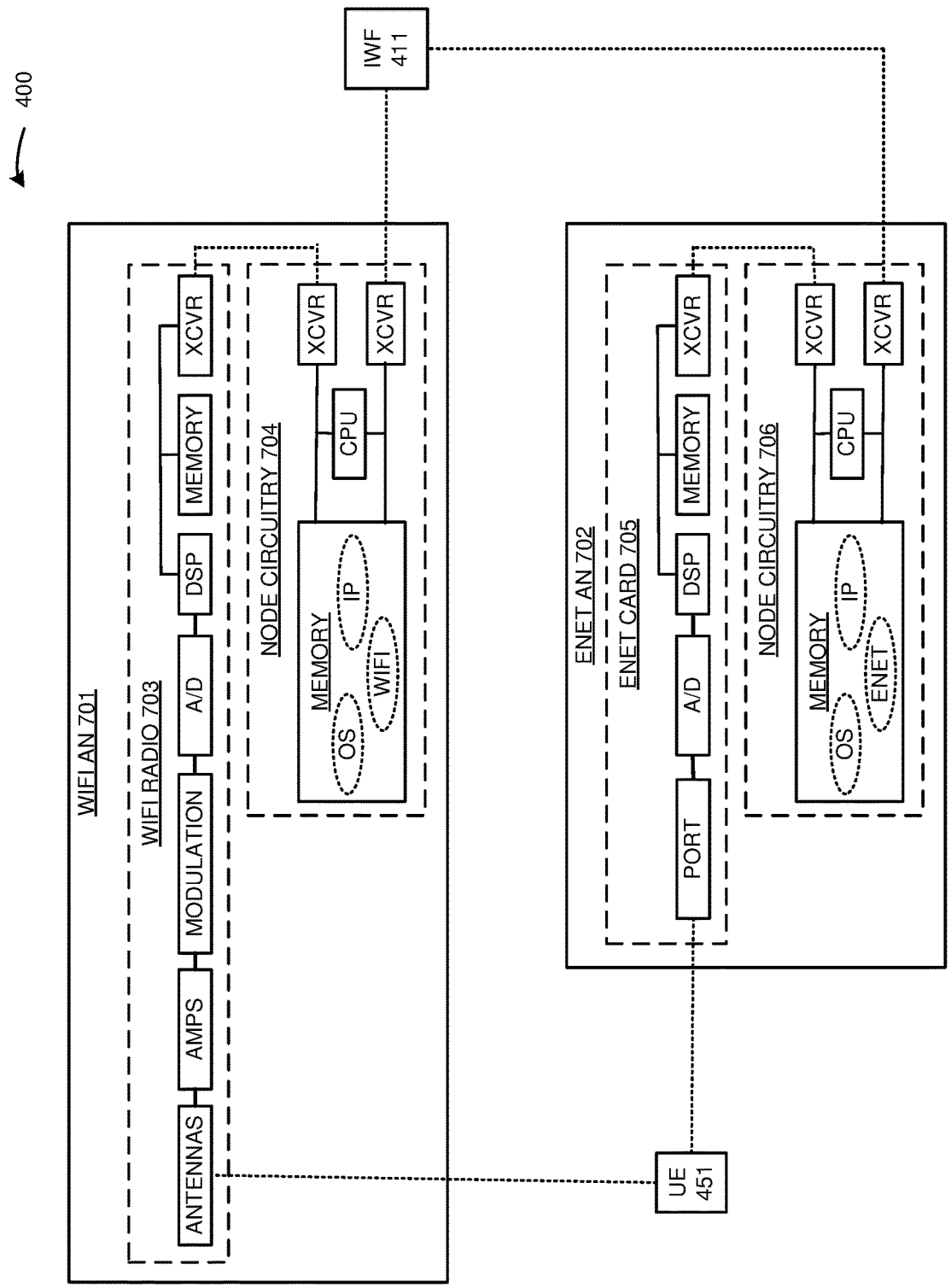
FIG. 7 illustrates exemplary non-3GPP access nodes in the 5G home communication network.

FIG. 7 illustrates exemplary non-3GPP access nodes 701-702 in 5G home communication network 400. Non-3GPP access nodes 701-702 comprise examples of wireless access nodes 112 and 152 and access networks 402 and 452, although nodes 112 and 152 and networks 402 and 452 may differ. WIFI AN 701 comprises WIFI radio 703 and node circuitry 704. WIFI radio 703 comprises antennas, amplifiers, filters, modulation, analog-to-digital interfaces, DSP, memory, and transceivers that are coupled over bus circuitry. Node circuitry 704 comprises memory, CPU, user interfaces and components, and transceivers that are coupled over bus circuitry. The memory in node circuitry 704 stores an operating system and network applications for IP and WIFI. The antennas in WIFI radio 704 are wirelessly coupled to UE 451 over a WIFI link. Transceivers in WIFI radio 703 are coupled to transceivers in node circuitry 704. Transceivers in node circuitry 704 are coupled to transceivers in IWF 411. The CPU in node circuitry 704 executes the operating system and network applications to exchange network signaling and user data with UE 451 and with IWFs.

ENET AN 702 comprises ENET card 705 and node circuitry 706. ENET card 705 comprises ports, analog-to-digital interfaces, DSP, memory, and transceivers that are coupled over bus circuitry. Node circuitry 706 comprises memory, CPU, user interfaces and components, and transceivers that are coupled over bus circuitry. The memory in node circuitry 706 stores an operating system and network applications for IP and ENET. The ports in ENET card 705 are wireline coupled to UE 451 over an ENET link. Transceivers in ENET card 705 are coupled to transceivers in node circuitry 706. Transceivers in node circuitry 706 are coupled to transceivers in IWF 411. The CPU in node circuitry 706 executes the operating system and network applications to exchange network signaling and user data with UEs and IWFs.

Figure 8:
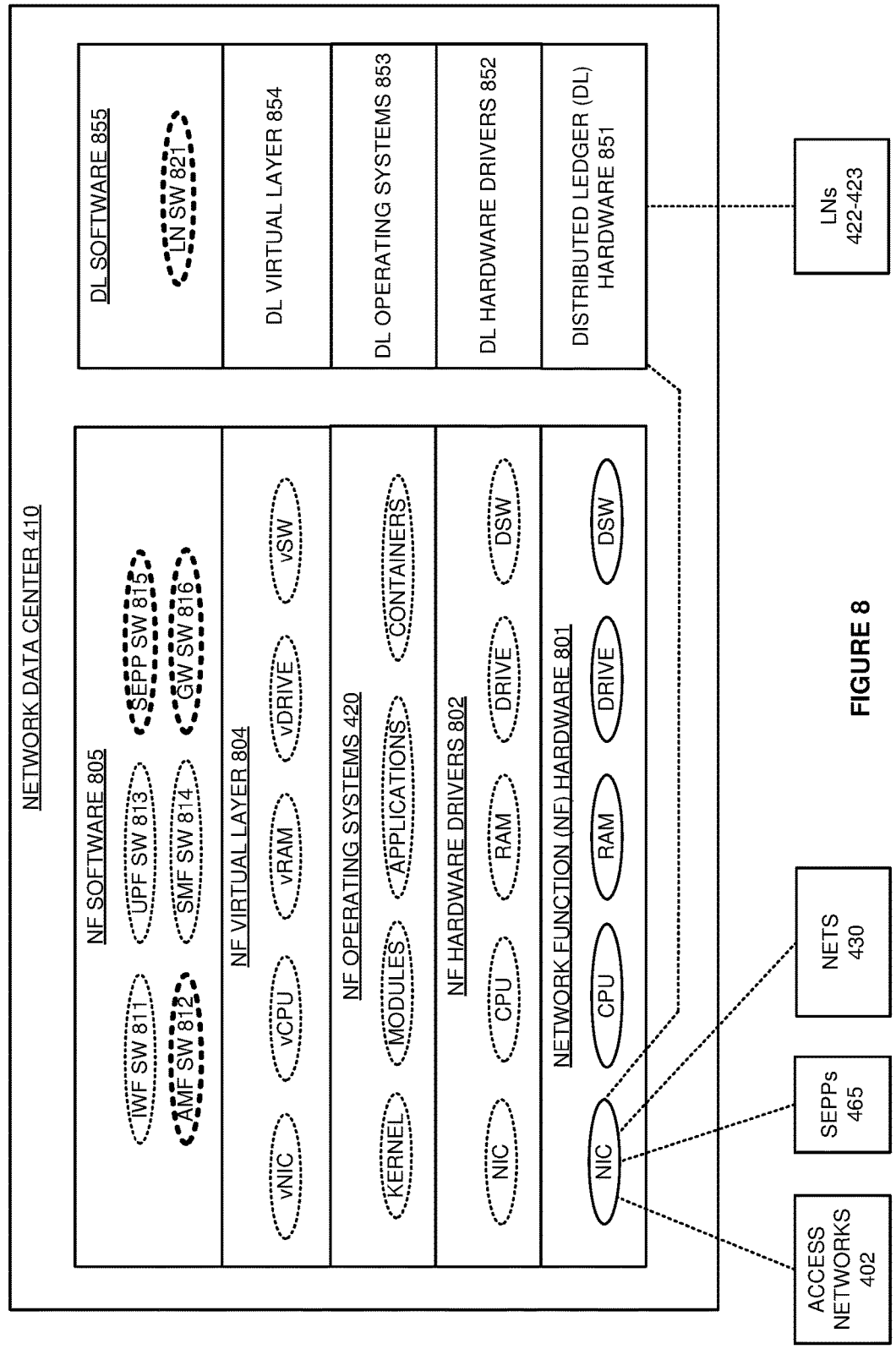
FIG. 8 illustrates an exemplary network data center in the 5G home communication network.

FIG. 8 illustrates exemplary network data center 410 in 5G home communication network 400. Network data center 410 comprises an example of user-planes 113 and 153, controllers 114 and 154, gateways 114 and 154, ledger 120, and data centers 460 although these user-planes, controllers, gateways, ledger, and data centers may differ. Network data center 410 comprises Network Function (NF) hardware 801, NF hardware drivers 802, NF operating systems 803, NF virtual layer 804, and NF Software (SW) 805, Distributed Ledger (DL) hardware 851, DL hardware drivers 852, DL operating systems 420, DL virtual layer 854, and DL SW 855. NF hardware 801 comprises Network Interface Cards (NICs), CPU, RAM, Flash/Disk Drives (DRIVE), and Data Switches (DSW). DL hardware 851 could be similar. NF hardware drivers 802 comprise software that is resident in the NIC, CPU, RAM, DRIVE, and DSW. DL hardware drivers 852 could be similar. NF operating systems 420 comprise kernels, modules, and applications that form containers for virtual layer and NF software execution. DL operating systems 853 could be similar. NF virtual layer 804 comprises vNIC, vCPU, vRAM, vDRIVE, and vSW. DL virtual layer 854 could be similar. NF SW 805 comprises IWF SW 811, AMF SW 812, UPF SW 813, SMF SW 814, SEPP SW 815, and GW SW 816. Other NFs like Network Repository Function (NRF) are typically present but are omitted for clarity. DL SW 855 comprises Ledger Node (LN) SW 821. Network data center 410 may be located at a single site or be distributed across multiple geographic locations. The NIC in NF hardware 801 are coupled to access networks 402, SEPPs 465, networks 430, and DL hardware 851. The NIC in DL hardware 851 are coupled to NF hardware 801 and LNs 422-423. NF hardware 801 executes NF hardware drivers 802, NF operating systems 803, NF virtual layer 804, and NFs 805 to form and operate IWF 411, AMF 412, UPF 413, SMF 414, SEPP 415, and GW 416. DL hardware 851 executes DL hardware drivers 852, DL operating systems 853, DL virtual layer 854, and DL SW 855 to form and operate LN 421.

Figure 9:
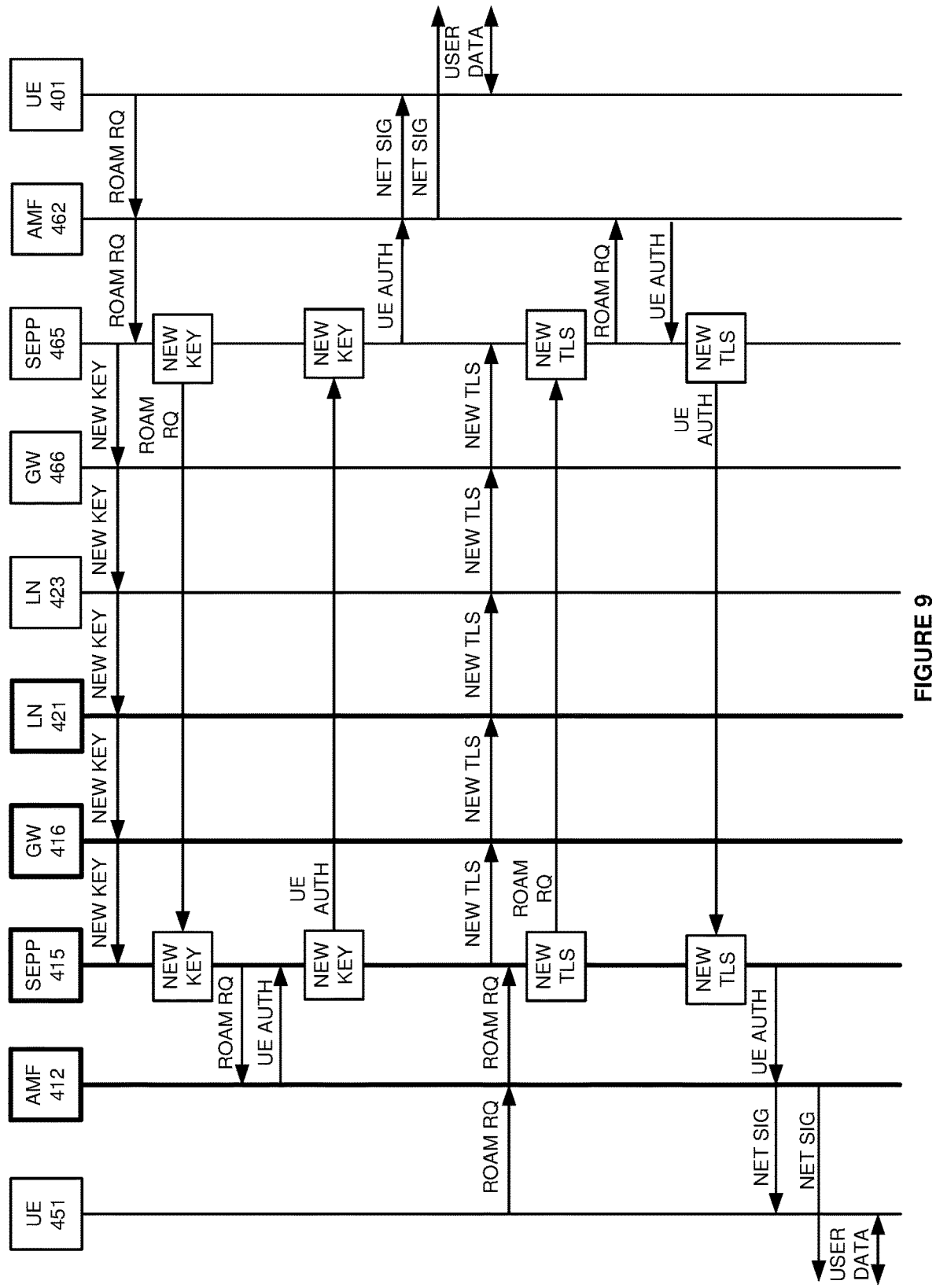
FIG. 9 illustrates an exemplary operation of the 5G home communication network to serve the wireless data service to the visiting UEs that are affiliated with the visited networks and to authorize the wireless data service for the home UEs that are visiting the visited networks.

FIG. 9 illustrates an exemplary operation of 5G home communication network 400 to serve the wireless data service to visiting UE 451 that is affiliated with visited communication networks 450 and to authorize the wireless data service for home UE 401 that is visiting visited communication networks 450. The operation may differ in other examples. One of SEPPs 465 is configured to use a new public key, and in response, transfers its new public key to one of GWs 466 which transfers the new public key to one of LNs 423. LNs 421-423 interact to develop consensus on the new public key. LN 421 notifies GW 416 of the new transaction—the new public key for the one of SEPPs 465. GW 416 transfers the new public key for the one of SEPPs 465 to SEPP 415.

UE 401 is affiliated with 5G home communication network 400 but is visiting one of 5G visited communication networks 450. UE 401 transfers a roaming request to one of AMFs 462 which transfers the roaming request to the one of SEPPs 465 that has the new public key. This one of SEPPs 465 transfers a roaming request for UE 401 to SEPP 415 and uses its new public key. SEPP 415 uses the new public key to validate the roaming request from the one of SEPPs 465. SEPP 415 transfers the authenticated roaming request to AMF 412 which authenticates and authorizes UE 401 and transfers a roaming authorization for UE 401 to SEPP 415. SEPP 415 transfers the roaming authorization for UE 401 to the one of SEPPs 465, and the SEPPs may again use the new public key. The one of SEPPs 465 transfers the roaming authorization for UE 401 to the one of AMFs 462. The one of AMFs 462 signals UE 401 and other network elements (not shown). UE 401 exchanges user data with networks 430 (not shown).

SEPP 415 is configured with a new TLS algorithm, and in response, SEPP 415 transfers its new TLS algorithm ID to GW 416. GW 416 transfers the new TLS algorithm ID for SEPP 415 to LN 421. LNs 421-423 interact to develop consensus on the new TLS algorithm ID for SEPP 415. LNs 423 notify GWs 466 of the new transaction—the new TLS algorithm ID for SEPP 415 in home network 400. GWs 466 transfer the new TLS algorithm ID for SEPP 415 to SEPPs 465.

UE 451 is affiliated with 5G visited communication network 450 but is visiting 5G home communication network 400. UE 451 transfers a roaming request to AMF 412 which transfers the roaming request to SEPP 415. SEPP 415 transfers the roaming request for UE 451 to the one of SEPPs 465 and uses the new TLS algorithm. The one of SEPPs 465 receives the roaming request using the new TLS algorithm and transfers the roaming request to one of AMFs 462 which authenticates and authorizes UE 451 and transfers a roaming authorization for UE 451 to the one of SEPPs 465. The one of SEPPs 465 transfers the roaming authorization for UE 451 to SEPP 415 and the two SEPPs may again use the new TLS algorithm. SEPP 415 transfers the roaming authorization for UE 451 to AMF 412. AMF 412 signals UE 451 and other network elements (not shown). UE 451 exchanges user data with networks 430 (not shown).

Figure 10:
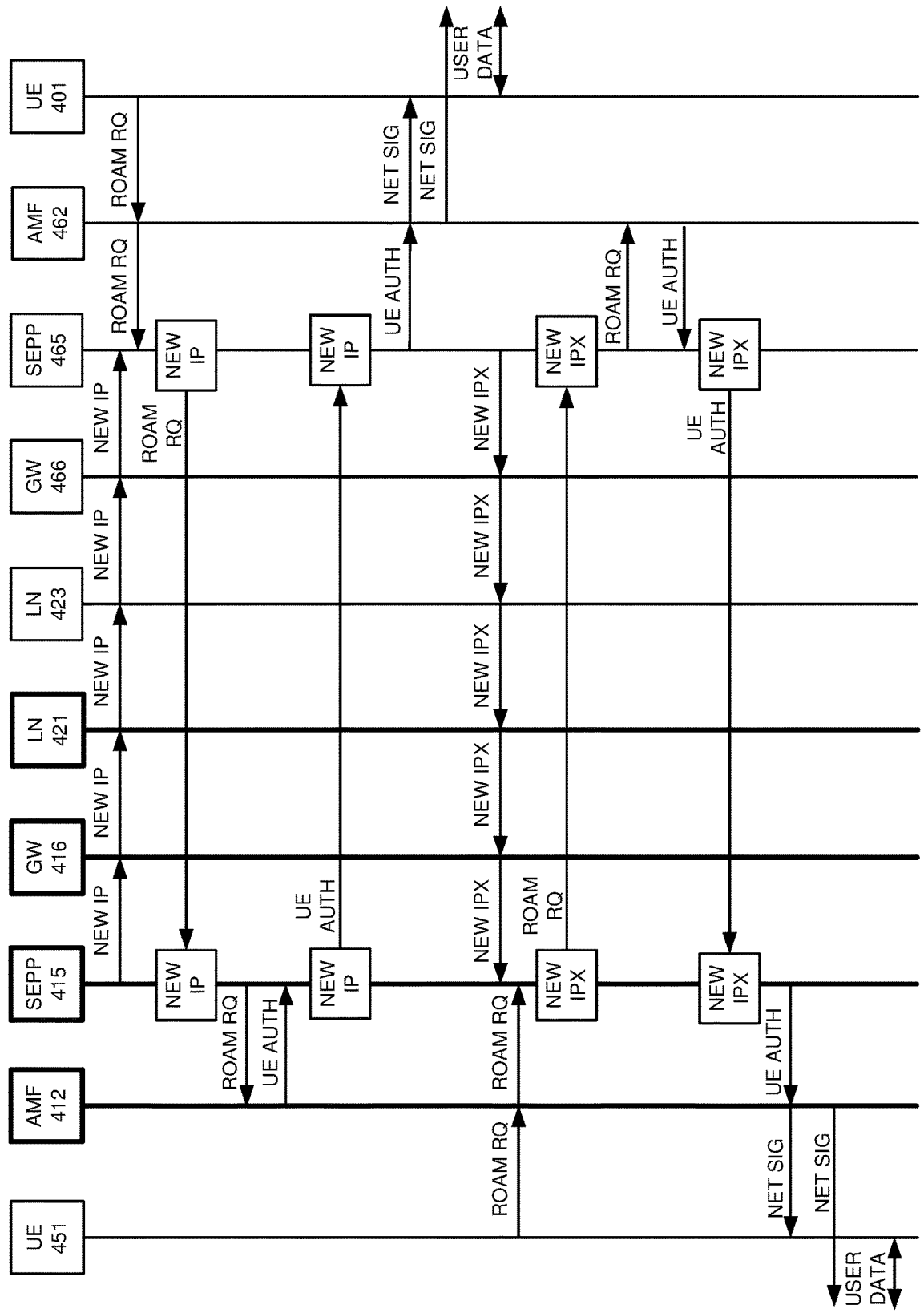
FIG. 10 illustrates an exemplary operation of the 5G home communication network to serve the wireless data service to the visiting UEs that are affiliated with the visited networks and to authorize the wireless data service for the home UEs that are visiting the visited networks.

FIG. 10 illustrates an exemplary operation of 5G home communication network 400 to serve the wireless data service to visiting UEs 451 that are affiliated with visited communication networks 450 and to authorize the wireless data service for home UEs 401 that are visiting visited communication networks 450. The operation may differ in other examples. SEPP 415 is configured with a new IP address, and in response, SEPP 415 transfers its new IP address to GW 416. GW 416 transfers the new IP address for SEPP 415 to LN 421. LNs 421-423 interact to develop consensus on the new IP address for SEPP 415. LNs 423 notify GWs 466 of the new transaction—the new IP address for SEPP 415 in home network 400. GWs 466 transfer the new IP address for SEPP 415 to SEPPs 465.

UE 401 is affiliated with 5G home communication network 400 but is visiting one of 5G visited communication networks 450. UE 401 transfers a roaming request to one of AMFs 462 which transfers the roaming request to one of SEPPs 465. The one of SEPPs 465 transfers a roaming request for UE 401 to SEPP 415 using its new IP address. SEPP 415 uses the new IP address to receive the roaming request from the one of SEPPs 465. SEPP 415 transfers the authenticated roaming request to AMF 412 which authenticates and authorizes UE 401 and transfers a roaming authorization for UE 401 to SEPP 415. SEPP 415 transfers the roaming authorization for UE 401 to the one of SEPPs 465, and the two SEPPs again use the new IP address. The one of SEPPs 465 transfers the roaming authorization for UE 401 to the one of AMFs 462. The one of AMFs 462 signals UE 401 and other network elements (not shown). UE 401 exchanges user data with networks 430 (not shown).

One of SEPPs 465 is configured to use a new IPX parameter, and in response, transfers its new IPX parameter to one of GWs 466 which transfers the new IPX parameter to one of LNs 423. LNs 421-423 interact to develop consensus on the new IPX parameter. LN 421 notifies GW 416 of the new transaction—the new IPX parameter for the one of SEPPs 465. GW 416 transfers the new IPX parameter for the one of SEPPs 465 to SEPP 415.

UE 451 is affiliated with 5G visited communication network 450 but is visiting 5G home communication network 400. UE 451 transfers a roaming request to AMF 412 which transfers the roaming request to SEPP 415. SEPP 415 transfers the roaming request for UE 451 to the one of SEPPs 465 and uses the new IPX parameter. The one of SEPPs 465 transfers the roaming request to one of AMFs 462 which authenticates and authorizes UE 451 and transfers a roaming authorization for UE 451 to the one of SEPPs 465. The one of SEPPs 465 transfers the roaming authorization for UE 451 to SEPP 415 and the two SEPPs may again use the new IPX parameter. SEPP 415 transfers the roaming authorization for UE 451 to AMF 412. AMF 412 signals UE 451 and other network elements (not shown). UE 451 exchanges user data with networks 430 (not shown).

Figure 11:
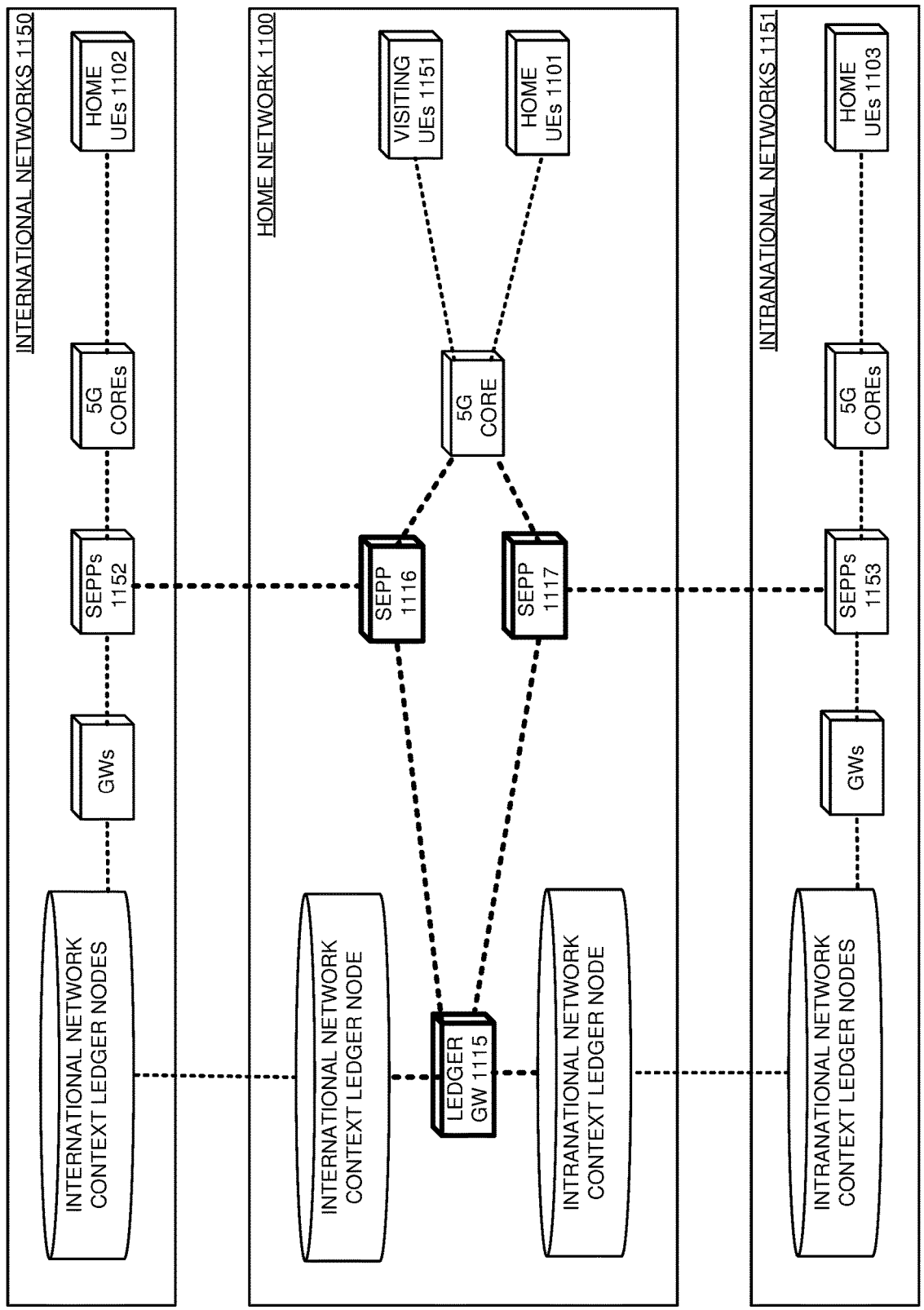
FIG. 11 illustrates an exemplary home communication network to serve wireless data services to visiting UEs that are affiliated with intranational networks and international networks and to authorize the wireless data service for the home UEs that are visiting the intranational networks and the international networks.

FIG. 11 illustrates an exemplary home communication network 1100 to serve wireless data services to visiting UEs 1151 that are affiliated with intranational networks 1150 and international networks 1151 and to authorize the wireless data service for home UEs 1102-1103 that are visiting international networks 1150 and intranational networks 1151. International networks 1150 and intranational networks 1151 comprise examples of visited networks 150 and 450, although visited networks 150 and 450 may differ. Home network 1100 comprises an example of home networks 100 and 400, although home networks 100 and 400 may differ. International networks 1150 exist externally to the United States of America. Intranational networks 1151 exist within the United States of America. Home network 1100 exists within the United States of America. Home network 1100 comprises an international network context ledger node, intranational network context ledger node, ledger GW 1115, SEPPs 1116-1117, and 5G core. International network 1150 comprises international network context ledger nodes, ledger GWs, SEPPs 1152, and 5G cores. Intranational network 1151 comprises intranational network context ledger nodes, ledger GWs, SEPPs 1153, and 5G cores. In some examples, ledger GW 1115 and the ledger nodes operate independently in home network 1100, and the 5G core, SEPPs 1116-1117, UEs 1101, and/or UEs 1151 may be omitted.

The intranational network context ledger nodes comprise an intranational distributed ledger. The international network context ledger nodes comprise an intranational distributed ledger. The intranational distributed ledger and the international distributed ledger should mirror one another. Secure access to the ledgers drives consensus. Ledger GW 1115 may perform the mirroring between the ledgers. As the SEPPs add, modify, or delete network context in their ledger nodes over their ledger gateways, the ledgers are mirrored. The mirrored ledgers notify their ledger GWs about new, modified, or deleted network context, and the ledger GWs notify their SEPPs about the new, modified, or deleted network context.

For example, one of SEPPs 1152 may post a new TLS setting to the international ledger over its GW, and the international network context ledger node notifies ledger GW 1115. Ledger GW 1115 transfers the new TLS setting for the one of SEPPs 1152 to SEPP 1116 and to the intranational network context ledger node. The one of SEPPs 1152 and SEPP 1116 use the new TLS setting to exchange UE authorization data. SEPPs 1153 may also use the new TLS setting to exchange UE authorization data with the one of SEPPs 1152.

In another example, one of SEPPs 1153 may post the new IPX setting to the intranational ledger over its GW, and the intranational network context ledger node notifies ledger GW 1115. Ledger GW 1115 transfers the new IPX setting for the one of SEPPs 1153 to SEPP 1117 and to the international network context ledger node. The one of SEPPs 1153 and SEPP 1117 then use the new IPX setting to exchange UE authorization data. SEPPs 1152 and the one of SEPPs 1153 may use the new IPX setting to exchange UE authorization data.

In another example, SEPP 1116 may post new IP addressing ledger GW 1115. Ledger GW 1115 posts the new IP addressing to the international network context ledger node, and the international ledger notifies SEPPs 1152 over the GWs. SEPP 1116 and SEPPs 1152 then use the new IP addressing to exchange UE authorization data. Through mirroring, SEPPs 1153 may use the new IP addressing. In yet another example, SEPP 1117 may post new IP addressing to ledger GW 1115. Ledger GW 1115 posts the new IP addressing to the intranational network context ledger node which notifies SEPPs 1153 over the GWs. SEPP 1117 and SEPPs 1153 then use the new IP addressing to exchange UE authorization data. Through mirroring, SEPPs 1152 may use the new IP addressing if needed. In another example, the international network and intranational network might not correspond to geo-political boundaries but instead correspond to networks that are outside and inside of a security administrative zone or jurisdiction subject to the same security policies and governance requirements, respectively The wireless data network circuitry described above comprises computer hardware and software that form special-purpose networking circuitry to serve wireless data service to visiting UEs and to authorize the wireless data service for home UEs that are visiting other networks. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose networking circuitry to serve wireless data service to visiting UEs and to authorize the wireless data service for home UEs that are visiting other networks.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a home network to serve a wireless data service to visiting User Equipment (UEs) affiliated with visited networks and to authorize the wireless data service for home UEs affiliated with the home network and visiting the visited networks, the method comprising:
    a network gateway transferring home network communication context to one or more distributed ledgers, receiving visited network communication context from the one or more distributed ledgers, and transferring the visited network communication context to a network controller;
    the network controller receiving the visited network communication context from the network gateway and exchanging network authorization data with the visited networks based on the visited network communication context and the home network communication context;
    the network controller authorizing the wireless data service for the home UEs and the visiting UEs responsive to the exchange of the network authorization data;
    the network controller transferring session signaling to wireless access nodes responsive to the authorization of the wireless data service for the visiting UEs and transferring authorization signaling to the visited networks responsive to the authorization of the wireless data service for the home UEs; and
    the wireless access nodes receiving the session signaling from the network controller and responsively delivering the wireless data service to the visiting UEs.

2. The method of claim 1 wherein the network controller comprises an Access and Mobility Management Function (AMF).

3. The method of claim 1 wherein the network controller comprises a Security Edge Protection Proxy (SEPP).

4. The method of claim 1 wherein the one or more distributed ledgers comprise:
    at least one international distributed ledger for international ones of the visited networks; and
    at least one intranational distributed ledger for intranational ones of the visited networks.

5. The method of claim 1 wherein:
    the visited network communication context comprises Transport Layer Security (TLS) for the visited networks; and
    the home network communication context comprises TLS information for the home network.

6. The method of claim 1 wherein:
    the visited network communication context comprises Internet Protocol Security (IPSec) information for the visited networks; and
    the home network communication context comprises IPSec information for the home network.

7. The method of claim 1 wherein:
    the visited network communication context comprises Internet Protocol (IP) addresses for the visited networks; and
    the home network communication context comprises an IP address for the home network.

8. The method of claim 1 wherein:
    the visited network communication context comprises Internetwork Packet Exchange (IPX) information for the visited networks; and
    the home network communication context comprises IPX information for the home network.

9. The method of claim 1 wherein:
    the visited network communication context comprises public cryptography keys for the visited networks; and
    the home network communication context comprises a public cryptography key for the home network.

10. The method of claim 1 wherein:
    the visited network communication context comprises Certificate Authorities (CAs) for the visited networks; and
    the home network communication context comprises a CA for the home network.

11. A home network to serve a wireless data service to visiting User Equipment (UEs) affiliated with visited networks and to authorize the wireless data service for home UEs affiliated with the home network and visiting the visited networks, the home network comprising:
    a network gateway configured to transfer home network communication context to one or more distributed ledgers, receive visited network communication context from the one or more distributed ledgers, and transfer the visited network communication context to a network controller;
    the network controller configured to receive the visited network communication context from the network gateway and exchange network authorization data with the visited networks based on the visited network communication context and the home network communication context;
    the network controller configured to authorize the wireless data service for the home UEs and the visiting UEs responsive to the exchange of the network authorization data;
    the network controller configured to transfer session signaling to wireless access nodes responsive to the authorization of the wireless data service for the visiting UEs and transfer authorization signaling to the visited networks responsive to the authorization of the wireless data service for the home UEs; and the wireless access nodes configured to receive the session signaling from the network controller and responsively deliver the wireless data service to the visiting UEs.

12. The home network of claim 11 wherein the network controller comprises an Access and Mobility Management Function (AMF).

13. The home network of claim 11 wherein the network controller comprises a Security Edge Protection Proxy (SEPP).

14. The home network of claim 11 wherein the one or more distributed ledgers comprise:
   at least one international distributed ledger for international ones of the visited networks; and
   at least one intranational distributed ledger for intranational ones of the visited networks.

15. The home network of claim 11 wherein:
   the visited network communication context comprises Transport Layer Security (TLS) for the visited networks; and
   the home network communication context comprises TLS information for the home network.

16. The home network of claim 11 wherein:
   the visited network communication context comprises Internet Protocol Security (IPSec) information for the visited networks; and
   the home network communication context comprises IPSec information for the home network.

17. The home network of claim 11 wherein:
   the visited network communication context comprises Internet Protocol (IP) addresses for the visited networks; and
   the home network communication context comprises an IP address for the home network.

18. The home network of claim 11 wherein:
   the visited network communication context comprises Internetwork Packet Exchange (IPX) information for the visited networks; and
   the home network communication context comprises IPX information for the home network.

19. The home network of claim 11 wherein:
   the visited network communication context comprises public cryptography keys for the visited networks; and
   the home network communication context comprises a public cryptography key for the home network.

20. The home network of claim 11 wherein:
   the visited network communication context comprises Certificate Authorities (CAs) for the visited networks; and
   the home network communication context comprises a CA for the home network.

* * * * *